United States Patent [19]

Jeppson

[11] Patent Number: 4,570,045
[45] Date of Patent: Feb. 11, 1986

[54] CONVEYORIZED MICROWAVE HEATING CHAMBER WITH DIELECTRIC WALL STRUCTURE

[76] Inventor: Morris R. Jeppson, P.O. Box 221489, Carmel, Calif. 93922

[21] Appl. No.: 587,565

[22] Filed: Mar. 8, 1984

[51] Int. Cl.[4] .............................................. H05B 6/78
[52] U.S. Cl. ..................... 219/10.55 A; 219/10.55 D; 34/1; 99/451
[58] Field of Search ................. 219/10.55 A, 10.55 F, 219/10.55 E, 10.55 R, 10.55 D; 99/451, DIG. 14; 34/1

[56] References Cited

U.S. PATENT DOCUMENTS

| | | | |
|---|---|---|---|
| 3,242,304 | 3/1966 | Hickman | 219/10.55 A |
| 3,263,052 | 7/1966 | Jeppson et al. | 219/10.55 |
| 3,365,562 | 1/1968 | Jeppson | 219/10.55 |
| 3,409,447 | 11/1968 | Jeppson | 219/10.55 A X |
| 3,422,242 | 1/1969 | Miyata | 219/10.55 A |
| 3,624,335 | 11/1971 | Dench | 219/10.55 D |
| 3,646,878 | 3/1972 | Keller | 99/DIG. 14 |
| 3,961,568 | 6/1976 | Jeppson | 219/10.55 A X |
| 4,168,418 | 9/1979 | Bird | 219/10.55 A |
| 4,246,462 | 1/1981 | Meisel | 219/10.55 A |
| 4,319,856 | 3/1982 | Jeppson | 219/10.55 A X |
| 4,405,850 | 9/1983 | Edgar | 219/10.55 A |
| 4,488,027 | 12/1984 | Dudley et al. | 219/10.55 A |

*Primary Examiner*—Philip H. Leung
*Attorney, Agent, or Firm*—Phillips, Moore, Lempio & Finley

[57] ABSTRACT

Apparatus (11, 11a, 11b, 11c) for heating substances (16, 16a, 16b, 16c) with microwave energy has a microwave containment housing (12, 12a) formed at least in part of thick microwave absorbent dielectric material (39, 39a, 39b) such as concrete or ceramic tile among other examples. Such materials are usually obtainable locally thereby avoiding the high costs of prefabricating all metal chamber components at a distant factory and shipping the bulky structure to the installation site. Unproductive absorption of microwave in the dielectric material is minimized, when necessary, by conductive elements (29, 29b, 42a, 42b, 64a, 64b, 67a, 67b) which reflect microwave energy. In the preferred form, such elements include a high strength metal conveyor (21, 21a, 21b, 21c, 21d, 29e, 21f) and means (68, 68a, 72, 73, 74) are provided, when necessary, to counteract underheating which may sometimes occur where substances contact a metal surface in a microwave field. The dielectric housing construction enables structural simplifications in conveyor entrance and exit tunnels (17, 18) and in access doors (53). The construction may include a series of separately energized, electrically isolated heating modules (13c, 13d, 13e, 13f) along the conveyor to increase processing capacity and to enable differing power levels at successive heating stages.

22 Claims, 10 Drawing Figures

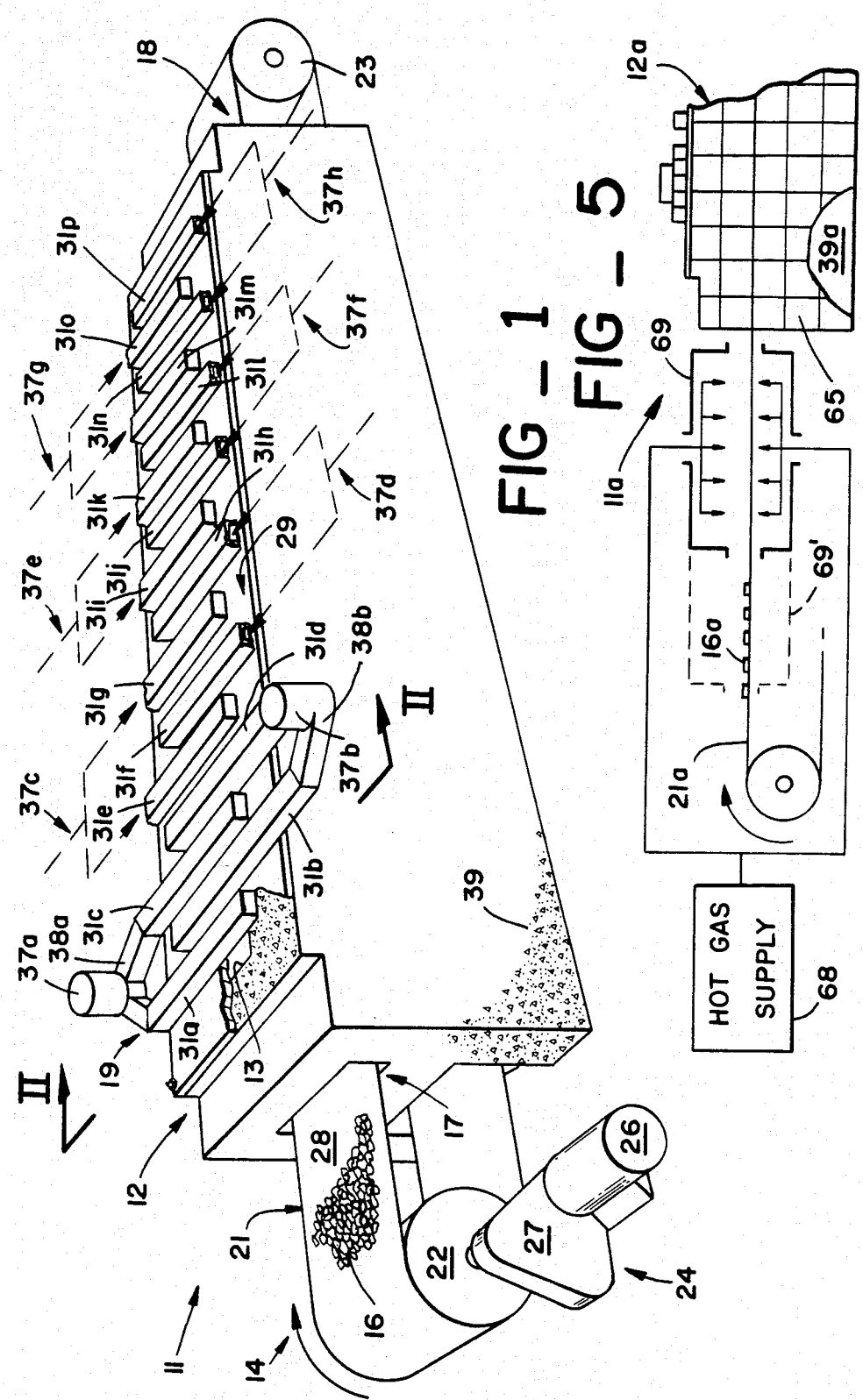

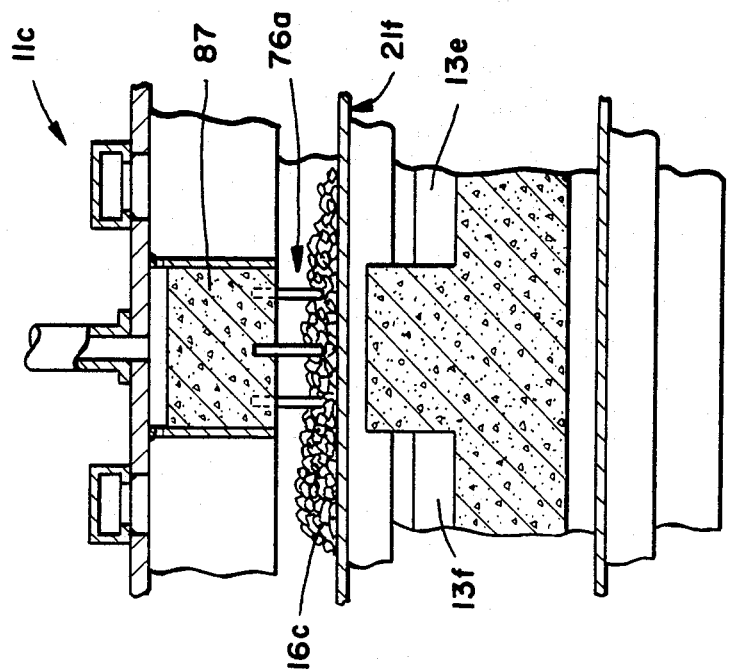
FIG_10
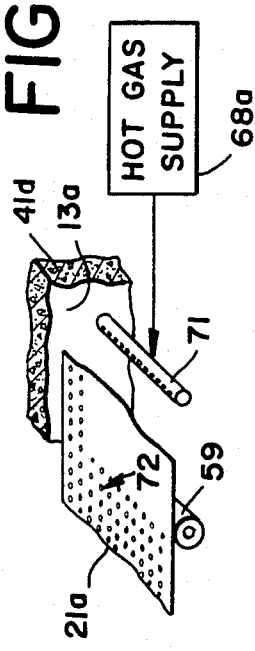
FIG_6
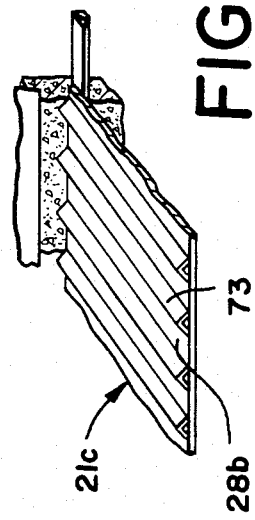
FIG_7
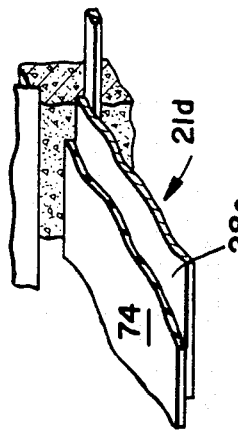
FIG_8

CONVEYORIZED MICROWAVE HEATING CHAMBER WITH DIELECTRIC WALL STRUCTURE

TECHNICAL FIELD

This invention relates to apparatus for heating substances with microwave energy and more particularly to microwave heating chambers having a conveyor or the like for carrying substances through a microwave region.

BACKGROUND OF THE INVENTION

Microwave energy heats many substances much more rapidly and uniformly than older heating techniques. Consequently, a variety of microwave heating chambers have been developed for processing industrial and agricultural products that require heat treatment. Such heating chambers are often equipped with a moving belt or other type of conveyor for carrying substances through the microwave region on a continuous process basis. Cooking of food products, drying materials and curing of plastics are among the many usages of conveyorized microwave heating chambers.

Safety considerations and the need to avoid interference with nearby electronic equipment dictate that the microwave energy be substantially wholly contained within the heating chamber. In order to contain the microwave energy it has been the prior practice to enclose the heating region with electrically conductive metal walls except at the conveyor access openings which in some installations are metal tunnels lined with microwave absorbent dielectric material.

Metal has appeared to be the obvious material for defining a microwave energy containment region as such energy is reflected by electrically conductive surfaces. Microwave energy penetrates non-conductive materials at least for substantial distances. Some non-conductive materials are electrically lossy dielectrics in which microwave energy is gradually absorbed. A thickness of at least about 20 centimeters is required for full absorption of industrial microwave frequencies by such lossy dielectric materials.

Microwave energy is costly to produce and absorption of such energy by anything other than the substance on the conveyor is a costly inefficiency in the heating operation. Thus absorbent dielectrics have not heretofore been believed to be desirable materials for defining the microwave energy containment region. The conductive metal walls of prior heating chambers enhance efficiency by repeatedly reflecting energy, that may have passed through the product unabsorbed or that may have bypassed the product, until such time as it is absorbed in the product.

While being very effective from the functional point of view, conveyorized microwave heating chambers of the above discussed kind also tend to be undesirably costly, particularly when the costs of shipping the apparatus from the factory to a distant point of use are taken into account. The metal walled heating chambers may require expensive materials and must be carefully manufactured to assure that there are no potential leakage sites for microwave energy. Finished components are bulky and require careful handling during transport to the installation site. Such cost considerations may have inhibited usage of microwave heating in industrial operations. The problem is particularly acute where very large scale heating operations are required as correspondingly large heating chambers and conveyor systems are needed.

Unlike the chamber itself, the conveyor in most prior microwave heating installations of this kind is formed of non-conductor. Such conveyors are typically a belt or a vibrating trough formed of plastic material although conveyors formed of conductor such as metal are in general relatively stronger, more durable, more easily cleaned and are capable of withstanding higher temperatures. Several factors have heretofore tended to limit usage of conductive conveyors in microwave heating systems.

As previously pointed out, conveyor access to many prior microwave heating chambers is provided for by metal tunnels lined with lossy dielectric material through which the conveyor enters and leaves the microwave containment region. Microwave energy entering such tunnels from the containment region does not propagate along the axis of such tunnels in a straightforward manner. Such energy tends to spread out as it progresses along the tunnel. Consequently, it is repeatedly intercepted by the metal walls of the tunnel and reflected back towards the opposite walls. This causes such energy to repeatedly pass through the lossy dielectric lining of the tunnel which in turn results in a progressive attenuation of such energy as it travels along the tunnel. This is a highly advantageous access structure as it provides large, continually open passages into and out of the heating chamber while suppressing escape of microwave energy.

If a conductive conveyor belt, for example, extends through such an access tunnel in parallel relationship to the metal walls of the tunnel, the effect is to divide the tunnel into two parallel waveguides or microwave conductors. Attenuation of the microwave energy will still occur owing to the presence of some of the dielectric lining in each such waveguide but the attenuating effect is greatly reduced. At best, the tunnels must be elongated or other undesirable structural complications introduced if a conductive conveyor is to be run through such a tunnel.

Another consideration which has inhibited use of conductive conveyors arise from the basic physical fact that electrical field intensity is always essentially zero at a conductive surface that bounds a microwave region. A difference in electrical potential or voltage cannot exist between two points on the surface of a conductor. It can readily be observed that the metal walls of a microwave oven are not directly heated by the microwave energy aside from some resistance heating by induced wall currents. This has led to a general assumption that direct heating by microwave energy will not occur in that part of a dielectric substance that is in actual contact with the surface of a conductive conveyor and that only reduced heating will occur for a small distance outwardly from such a conveyor surface.

Other seemingly adverse characteristics of conductive conveyors include the fact that most electrical conductors are also excellent thermal conductors. An electrically conductive belt or the like is not itself directly heated by microwave energy and thus is capable of conducting heat out of substances which rest on the conveyor. Electrical arcing can also present problems as damaging, energy dissipating sparks can occur between a metal belt and adjacent conductive chamber walls in a microwave field unless sizable spacing is provided by reducing the width of the belt relative to that of the chamber itself.

It would be advantageous if the foregoing problems were resolved to enable more widespread use of conductive conveyors which, as previously discussed, have a number of very desirable characteristics. If the foregoing problems are overcome, conductive conveyors such as metal belts would be more useful in installations of any size but this is particularly the case in very large heating installations where product loads and processing rates may be beyond the capabilities of plastic belts or the like because of the limited structural strength of such materials.

Resolution of the foregoing problems would also enable use of a single lengthy high strength metal conveyor for carrying products through other work stations as well as a microwave heating chamber and thereby reducing handling and transfering of the product between a series of separate conveyors. As one example, industrial precooking of bacon may involve movement of the product from a slicer to a steam precooker and then through a microwave heating chamber to a packaging station. A series of plastic belts has been used for this purpose because of the strength limitations of such materials. Sliced bacon is fragile and transfering of the product between belts has been a significant source of product loss.

The present invention is directed to overcoming one or more of the problems set forth above.

SUMMARY OF THE INVENTION

In one aspect of the present invention, apparatus for heating substances with microwave energy has a housing that forms a microwave energy containment chamber, conveyor means for carrying the substances along a predetermined path in the chamber and microwave input means for directing microwave energy into the chamber. At least portions of the housing are formed of electrically lossy dielectric material of sufficient thickness to absorb microwave energy that penetrates into the dielectric material, the dielectric portions of the housing being positioned to intercept microwave energy which propagates away from the region between the input means and the conveyor means.

In another more specific aspect of the invention, apparatus for heating substances with microwave energy includes a continuous belt conveyor positioned to carry substances through a heating region, the continuous belt conveyor having at least a layer of electrically conductive material over which the substances are supported on the belt, means for driving the continuous belt conveyor, a microwave containment housing at the heating region having sidewalls of microwave absorbent dielectric material extending along each side of the continuous belt conveyor at the sides of the heating region, means for directing microwave energy towards the electrically conductive material of the continuous belt conveyor within the microwave containment housing, and microwave energy reflective means for intercepting and returning microwave energy that propagates away from the substances carried on the continuous belt conveyor.

In still another more specific aspect, the invention provides a conveyorized microwave heating chamber which includes spaced apart housing sidewalls of microwave absorbent electrically non-conductive material, a housing top wall spanning the sidewall to define a microwave containment region in conjunction therewith, the top wall having an electrically conductive surface facing the containment region and which overlaps the sidewalls for a distance sufficient to suppress escape of microwave energy at the junctions between the top wall and the sidewalls, conveyor access tunnels situated at opposite ends of the microwave containment region and each having sidewalls and a top wall formed of microwave absorbent electrically non-conductive material, an electrically conductive continuous conveyor belt extending into the microwave containment region through one of the access tunnels and extending out of the microwave containment region through the other of the access tunnels and having an upper surface facing the non-conductive top walls of the access tunnels and the conductive housing top wall in spaced apart relationship to each thereof, means for driving the conveyor belt to carry substances which are to be heated through the microwave containment region, and waveguide means for directing microwave energy downwardly from the housing top wall towards the upper surface of the conveyor belt.

The invention reduces the costs of conveyorized microwave heating installations as at least a sizable portion of the microwave containment chamber is formed of economical materials, such as concrete, ceramic or the like that are usually obtainable locally in the vicinity of the installation. Costly fabrication of bulky, high strength metal chambers at a distant factory and transport of such components to the installation sites is unnecessary. Preferred forms of the invention include microwave reflective surfaces of metal or the like to avoid unproductive absorption of energy in the dielectric chamber walls but are not required to define a complete, structurally integral containment chamber and thus may be relatively inexpensive. The internal microwave reflective surfaces in the preferred forms of the invention include the surface of a high strength metal conveyor. The invention avoids problems which have heretofore discouraged use of metal conveyors in microwave heating chambers by providing a compatible access tunnel construction, by assuring adequate heating of substances adjacent the surface of such a conveyor, by enabling electrical isolation of successive chamber sections that are traversed by a conductive conveyor and by relaxing restrictions on the proportions and placement of a conductive conveyor in a microwave chamber.

BRIEF DESCRIPTION OF THE DRAWINGS

FIG. 1 is a perspective view of a conveyorized microwave heating chamber in accordance with one embodiment of the present invention.

FIG. 5 is a partially diagrammatic elevational section view of an end portion of another embodiment of the invention.

FIG. 6 is a perspective view illustrating a modified conveyor and adjacent components which may be utilized in microwave heating chambers in accordance with the invention.

FIG. 7 is a perspective view illustrating another form of modified conveyor and adjacent components which may be used in microwave heating chambers embodying the invention.

FIG. 8 is a perspective view of still another modified conveyor suitable for use in microwave chambers embodying the invention.

FIG. 10 is an elevation section view of the central portion of a conveyorized microwave heating chamber depicting a modification of the structure for electrically isolating successive portions of the chamber from each other.

DETAILED DESCRIPTION OF PREFERRED EMBODIMENTS

Figure 9:
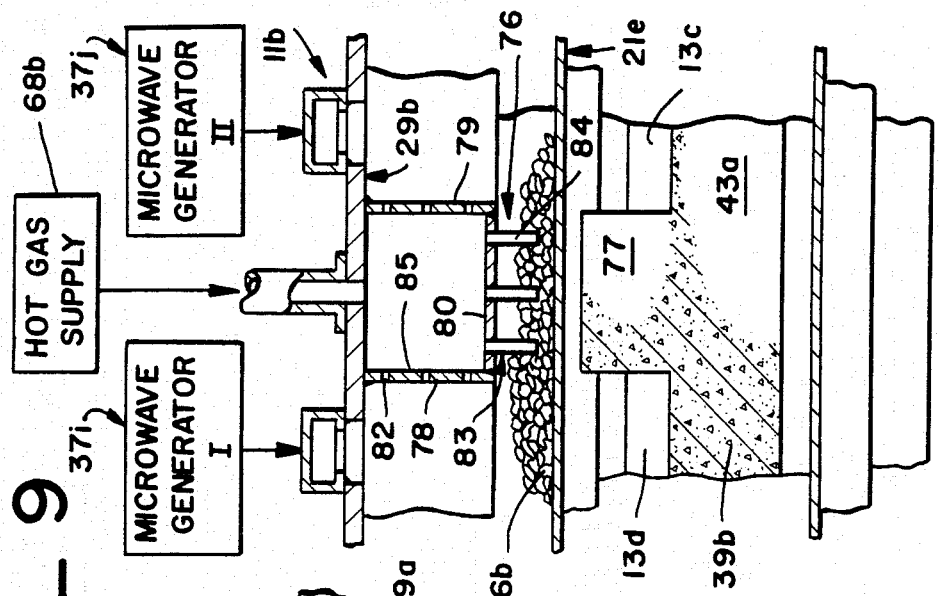
FIG. 9 is an elevation section view of the central portion of still another conveyorized microwave heating chamber in accordance with an embodiment of the invention in which successive portions of the chamber may be electrically isolated from each other.

Referring initially to FIG. 1 of the drawings, a conveyorized microwave heating apparatus 11 includes a housing 12 forming a microwave energy containment chamber 13 and conveyor means 14 for carrying substances 16 which are to be heated along a predetermined path within the chamber. The conveyor means 14 of this embodiment of the invention enters and leaves housing 12 through entrance and exit access tunnel portions, 17 and 18 respectively, at opposite ends of the housing. Microwave input means 19 directs microwave energy into the chamber 13 to heat the substances 16 during passage through the chamber.

The substance 16 shown being heated in FIG. 1 for purposes of example is fragmented coal that is to be dried but, as is understood in the art, a diverse variety of other electrically non-conductive materials may also be processed in a microwave heating apparatus 11.

The conveyor means 14 of this example of the invention includes a continuous belt 21 engaged on rotatable drums 22 and 23 that are situated at opposite ends of housing 12 near access tunnels 17 and 18 respectively. Means 24 for driving the conveyor belt 21 in this embodiment includes an electrical motor 26 coupled to drum 22 through a speed reducing gear box 27.

The conveyor belt 21 of this example is formed of thin flexible electrically conductive metal such as sheet steel. It is possible to use a non-conductive belt in the dielectric walled heating apparatus 11 but in most cases a more efficient utilization of the microwave energy can be realized if the belt 21 or other conveyor has a conductive surface 28 facing the microwave input means 19 and the belt may be stronger and more durable if it is formed largely or wholly of metal. The conductive surface 28 of the belt 21 reflects microwave energy that has passed through substance 16 unabsorbed back through the substance. It is not essential for this purpose that the belt be formed of solid sheet material as in this example as microwave energy is not transmitted through openings in a conductive surface if each such opening is distinctly smaller than the microwave wavelength. Such wavelengths are typically at least several centimeters. Thus porous belts, metal mesh belts and belts of the type having metal links that are pivoted together will also reflect microwave energy provided that the passages through such belts have transverse dimensions substantially smaller than the microwave wavelength.

While a continuous belt 21 is the preferred form of conveyor means 21 in many instances, other types, such as inclined chutes, vibrating troughs or the like may also be used and will similarly reflect microwave energy if a conductive surface 28 on the conveyor faces the microwave input means 19.

Figure 2:
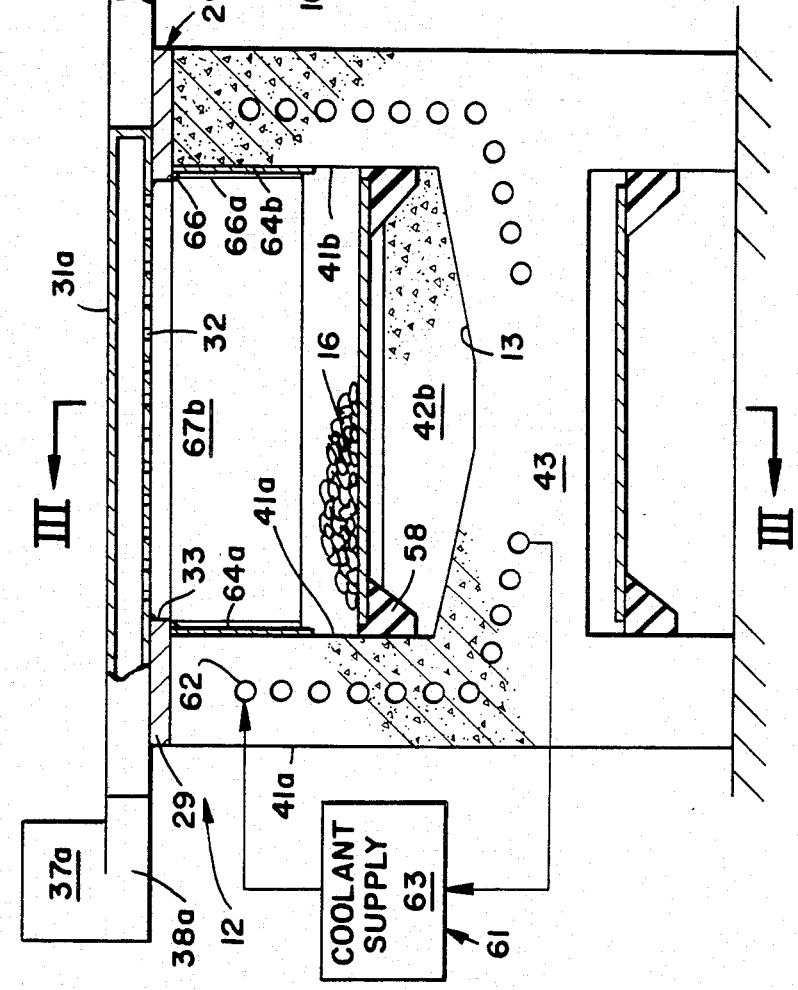
FIG. 2 is a cross section view of the apparatus of FIG. 1 taken along line II—II thereof.
Figure 3:
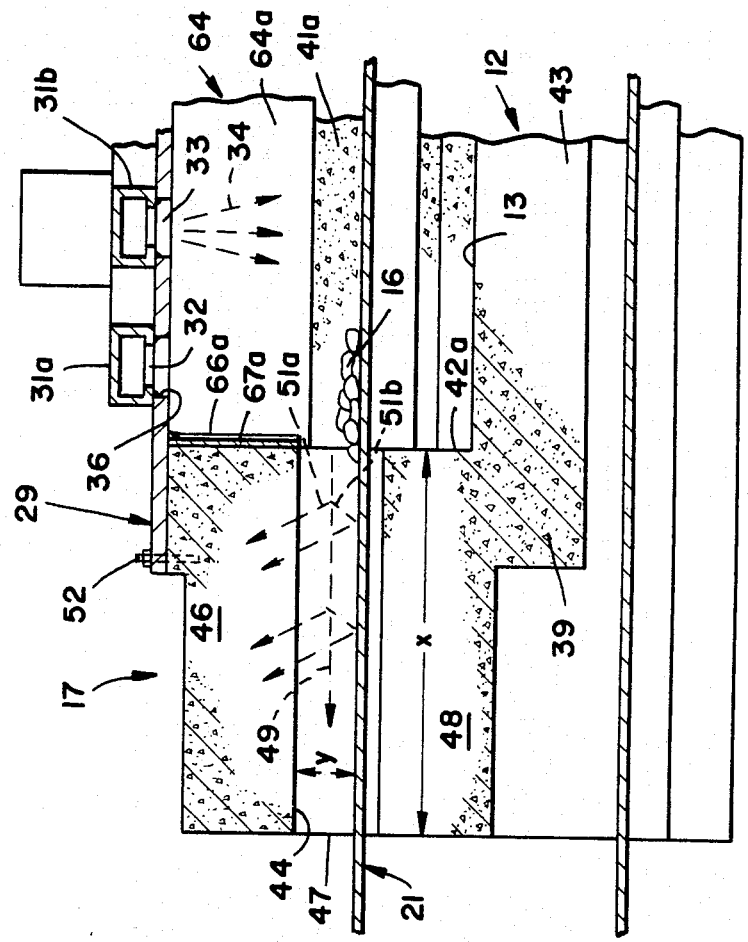
FIG. 3 is an elevational section view of a portion of the apparatus of FIGS. 1 and 2 taken along line III—III of FIG. 2.

The microwave input means 19 is secured to a rectangular, electrically conductive metal top plate 29 that forms the top of the microwave containment chamber 13 and which extends in parallel relationship to the conveyor belt surface 28. The microwave input means 19 of this embodiment has a plurality of spaced apart waveguides 31 secured to top plate 29 and arranged to extend transversely to the path of travel of conveyor belt 21. Referring now to FIGS. 2 and 3 in conjunction, the waveguides 31 are of the leaky type, described in my prior U.S. Pat No. 3,263,052, that release microwave energy in a distributed manner from each of a series of apertures 32 along a wall of the waveguide. Transverse slots 33 are provided in top plate 29 immediately below the waveguides 31 so that microwave energy from apertures 32 is directed downward towards conveyor belt 21 as indicated by dashed arrows 34 in FIG. 3. Welds 36 secure each waveguide 31 to top plate 29 along each side of the underlying slot 33 and, as such welds are formed of microwave reflective conductive metal, also serve to assure that no microwave leakage occurs between the waveguides and the top plate.

Referring again to FIG. 1, the first and third waveguides, 31a and 31c respectively, are jointly energized by a first microwave energy generator 37a which is a magnetron tube in this example. Generator 37a is situated at one side of top plate 29 and is coupled to the two waveguides 31a and 31c through a power splitter 38a. The second and fourth waveguides, 31b and 31d respectively, are similarly energized by a second microwave energy generator 37b situated at the opposite side of top plate 29 and which is coupled to the two waveguides 31b, 31d by a second power splitter 38b. Additional microwave generators 37c to 37h are coupled to pairs of the additional waveguides 31e to 31p in a similar manner as indicated diagrammatically in FIG. 1.

The above described arrangement of successive ones of the microwave generators 37a to 37h at alternating sides of the chamber 13 with each generator being coupled to a pair of the waveguides 31a to 31p that are separated by an intervening waveguide energized by a different generator is highly advantageous in that it contributes to uniformity of heating of the substances 16 but other configurations which include one or more generators and one or more waveguides may also be utilized.

Referring again to FIGS. 2 and 3 in conjunction, chamber 13 within the housing 12 constitutes a microwave containment region that is established primarily by microwave absorbent, electrically non-conductive material 39 in contrast to the metal chamber constructions of the prior practice. In this embodiment, the sidewalls 41a and 41b, end walls 42a and 42b and the floor 43 of the housing 12 are each formed of the absorbent material 39 and are each of sufficient thickness to substantially fully absorb microwave energy that penetrates into the material from chamber 13. While it is also possible to define the roof of the microwave containment region with such material 39, the metal top plate 29 is used for that purpose in the present embodiment as it is usually more efficient from the energy utilization standpoint if a microwave reflective conductive surface faces the conductive surface 28 of the conveyor 21 as will hereinafter be discussed in more detail.

Materials 39 suitable for use in the dielectric wall portions 41a, 41b, 42a, 42b, 43 of housing 12 include a variety of different types many of which are usually obtainable at economical costs near the site of the heating installation 11 and many of which have structural properties well suited for defining such a housing. Many electrically non-conductive or insulative materials are not particularly lossy or microwave absorbent. Others are polarizing dielectrics having relatively high values of dielectric permittivity (k). Repetitive displacements of polarizing charges occur in such dielectrics in response to the oscillating electric field gradients present in a microwave field. This results in a progressive conversion of the microwave energy into heat energy as it propagates through such dielectrics. Thus a progressive attenuation of the microwave energy occurs as it propagates through the dielectric and at some depth, dependent primarily on permittivity factor (k) of the material, substantially complete absorption of the microwave energy has occurred. Such polarizing dielectrics are the preferred materials 39 for the dielectric portions of the housing 12 since walls of such materials need not be undesirably thick in order to suppress release of microwave energy from the chamber 13.

Commonly available structural materials that are efficient polarizing dielectrics include, among a number of other examples, most concretes, bricks and other ceramics, glasses and stone structural materials in general. Such materials are primarily derived, directly or indirectly, from rock and most types of rock are very strongly polarizing dielectrics. There are some exceptions. Pure quartz, for example, is a very weak microwave absorber. A concrete composed of very pure limestone aggregates will also exhibit weak absorbency. However, concretes based on rocks that contain silicates, as is much more commonly the case, are very strong absorbers. Thus the microwave absorbency of specific batches of such material should be tested, if it is not already known, prior to use of the material in the housing 12.

The dielectric material 39 of the housing 12 depicted in FIG. 1 is concrete for purposes of example but it should be recognized that other materials of the kind discussed above or combinations of such materials may also be utilized in the housing. Substantially complete absorption of outwardly propagating microwave energy can be realized with the strongly absorptive materials of this kind such as the concrete 39 if the wall portions 41a, 41b, 42a, 42b and 43 of the housing 12 have a minimum thickness of about 20 centimeters. It is usually preferable to provide a somewhat greater wall thickness of, for example, about 30 centimeters to allow for possible variations in microwave absorbency from the design value that could be present from any of a number of causes such as variations in the proportions of the concrete ingredients during construction of the housing 12.

Relatively smaller wall thicknesses are feasible if the concrete 39 contains high density aggregates, such as iron ore or blast furnace slag, that have a higher loss factor than more typical aggregates.

The absorptive dielectric material 39 of the housing 12 need not necessarily be solid and suitable materials are not confined to those derived from rock. Volumes of loose or fluid absorptive material such as sand, gravel or water may be used to define portions of the housing 12 by containing such materials between spaced apart support walls at least the inner one of which is non-conductive.

The presence of thick volumes of dielectric material 39 in walls of the chamber 13 enables a number of further economies and simplifications to be realized relative to a metal microwave containment chamber. For example, with reference to FIG. 3, a very simple access tunnel 17 construction is possible to allow the metal belt 21 to enter chamber 13 through an open passage 44 while suppressing the escape of microwave energy from the chamber.

The top wall 46, sidewalls 47 and bottom wall 48 of the access tunnel 17 are each formed of the lossy dielectric material 39 and are each sufficiently thick to fully absorb microwave energy which penetrates into the wall as hereinbefore described. The absorptive tunnel walls 46, 47, 48 in conjunction with the microwave reflective metal conveyor belt 21 in effect constitute what is termed a gap trap and which rapidly attenuates a microwave energy as it attempts to propagate along the passage 44. Dashed arrow 49 diagrammatically indicates the nominal direction of propagation of such energy outwardly along passage 44. Such energy is not a coherent beam and continually tends to disperse outwardly from the nominal path of travel 49 as indicated by dashed arrows 51a and 51b. The portions 51a of such dispersing energy that propagate upwardly into top wall 46 or sidewardly into sidewalls 47 are then absorbed. The portions 51b that propagate downwardly to the metal conveyor belt 21 are reflected upwardly and thus are also absorbed in the top wall 46. As this process occurs continually along the nominal path of travel 49, microwave energy intensity rapidly diminishes along the path of travel. By making the length x of the passage 44 sufficiently long in relation to the distance y between top wall 46 and belt 21, microwave emission from the end of the access tunnel 17 is reduced to a negligible value which is within acceptable standards.

Adequate microwave energy attenuation may be realized in some cases, where a strongly absorptive dielectric material 39 is used by making the length x of passage 44 at least equal to the microwave wavelength, provided that the distance y between belt 21 and top wall 46 does not exceed about one fifth of the wavelength. As a practical matter, it is usually desirable to provide a somewhat lengthier passage 44 to assure adequate suppression of microwave energy release under conditions which may depart from design parameters. A small metallic object inadvertently carried into passage 44 by the conveyor, for example, can temporarily interfere with the energy attenuating effect at a portion of the passage. For example, if the distance y is about 5 centimeters and the material 39 is strongly absorptive concrete and the system operates at a microwave frequency of 915 MHZ, then an access tunnel passage 44 having a length x of at least about 43 centimeters is considered to be desirable although such value should not be taken to be limitative of the range of lengths that can be utilized in different systems.

Microwave energy attempting to propagate out through passage 44 below belt 21 is also attenuated in a similar manner. The conductive belt 21 in effect divides the access tunnel structure 17 into two parallel microwave suppressing gap traps.

Referring again to FIG. 1, the exit access tunnel 18 for conveyor belt 21 may have a construction similar to that of the entrance tunnel 17 as described above. The gap trap effect, heretofore used in a different context for enabling microwave heating of pavements from a moving applicator mounted on a vehicle, is further described in my prior U.S. Pat. No. 4,319,856.

In some systems where conveyor 21 is entirely within chamber 13, tunnels 17,18 can be eliminated and substances 16 may enter and leave the chamber through known microwave blocking access structures such as cut-off waveguides.

The thick dielectric walls 41a, 41b, 42a and 42b that bound the sides and ends of chamber 13 enable still other construction simplifications relative to a metal chamber. For example, assured suppression of microwave leakage at the junctions between top plate 29 and the chamber walls 41a, 41b, 42a and 42b is easily provided for simply by proportioning the top plate to overlap such walls for a distance that is preferably at least equal to half of the microwave wavelength. The edge portions 29a of the top plate 29 in conjunction with the underlying dielectric wall material 39 then suppress leakage by the gap trap effect as hereinbefore described. A similar junction between a metal top plate and metal walls could not be relied upon to suppress microwave leakage unless a microwave seal is provided and, as a practical matter, junctions between wall components of metal chambers are usually welded closed along the inside surface of the chamber both to assure against microwave leakage and to prevent electrical arcing at the junctions.

Referring to FIG. 3 in particular, any fasteners such as bolts 52 that may be present to secure the top plate 29 to the dielectric walls 41a, 41b, 42a, 42b of the housing 12 are situated a sufficient distance out from the interior chamber 13 to avoid interference with the gap trap effect. Such fasteners 52 may, for example, be situated at the corners of top plate 29.

Figure 4:
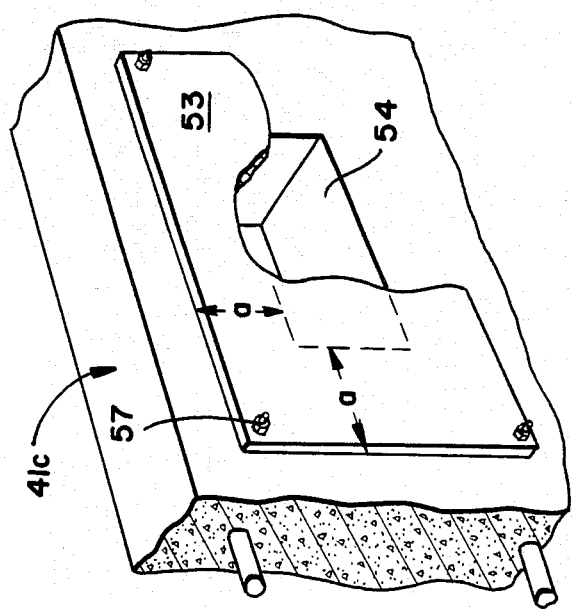
FIG. 4 is a perspective view of a portion of a wall of a microwave heating chamber in accordance with an embodiment of the invention depicting an access door construction which may be provided therein.

Considering still another construction simplification made possible by the presence of dielectric wall material 39, with reference to FIG. 4, it is sometimes desirable to provide one or more doors 53 in a chamber sidewall 41c to facilitate cleaning or other maintenance operations at times when the apparatus is not operating. Metal doors on metal chambers must have expensive microwave seals to assure against leakage and such seals are a common source of maintenance problems.

A simplified door 53 construction may be utilized to close an opening 54 in a dielectric chamber wall 41c by again relying on the gap trap effect. The door 53 may simply be an electrically conductive plate disposed against the outer surface 56 of wall 41c over opening 54 that is proportioned to overlap the portions of the wall adjacent the opening for a distance (a) sufficient to suppress microwave leakage by the previously described gap trap effect, the distance (a) preferably being at least equal to one half of the microwave wavelength. Fasteners 57 for releasably holding the door 53 in place are bolts in this example but may also variously be latches, hinges or the like. Any passages through door 53 that may be required by such fasteners 57 and any conductive elements of such fasteners that are situated between the door and wall 41c should be spaced from opening 54 by a distance at least equal to (a) to avoid interference with the gap trap effect.

Referring again to FIG. 2, guides 58 extend along the inner surfaces of housing sidewalls 41a and 41b in position to support the edges of belt 21. Where a metal belt 21 is used in a metal walled chamber, it is necessary that the belt be of substantially less width than the chamber itself to avoid arcing between the walls and the edges of the belt. This is not the case in the present construction although some slight spacing as depicted in FIG. 2 may be desirable to avoid abrasion of the belt 21. However, the guides 58 are formed of non-conductive material such as plastic to avoid arcing at the edges of the belt 21. As depicted in FIG. 6, other types of belt support such as rollers 59 may be provided if the flexibility of the belt 21a or the weight of the loads on the belt make it advisable. The metal belt 21a in conjunction with the adjacent dielectric sidewalls 41d act to shield such rollers from the microwave field to some extent thereby relaxing restrictions on the use of metallic parts in such rollers.

Referring again to FIG. 2, absorption of microwave energy in the dielectric walls 41a, 41b, 42b, 43 generates heat and in some instances it may be advisable to provide cooling means 61. In this example, coolant conduits 62 are embedded at spaced apart intervals within the dielectric material 39 and receive a flow of gaseous or liquid coolant from a coolant supply 63. An increase in the thickness of the dielectric material 39 of the housing 12 may be advisable to compensate for the presence of the coolant conudits although this is dependent on the composition of the conduits and the coolant itself. Water, for example, is a highly efficient microwave absorber. If water is used as the coolant and the conduits 62 are formed of electrically non-conductive material, little or no increase in the wall thickness may be needed.

The construction economies and simplifications which are realized by defining at least portions of the microwave containment chamber 13 with dielectric material could be offset by increased operating costs if sizable portions of the microwave energy were to be absorbed in the dielectric material 39 instead of in the substances 16 which are intended to be heated. Any of several techniques may be used singly or in combination to minimize energy absorption in the chamber 12 walls or to limit such absorption to an acceptable level.

For example, with reference to FIG. 3, microwave energy 34 as initially emitted from leaky waveguides 31a, 31b of the hereinbefore identified type is fairly directional and propagates downward towards conveyor belt 21 in this instance although some lateral dispersion occurs. If the substances 16 on the conveyor belt 21 are sufficiently absorptive and are loaded onto the conveyor in a sufficiently thick continuous layer, substantially complete absorption of the energy may occur during its initial propagation through the substance and very little of the energy will be unproductively absorbed by the chamber walls. Heating of the layer of substance 16 is non-uniform under that condition as heat generation falls off towards the bottom of the layer but this can be counteracted by mixing or stirring the substance as it is carried through the chamber 13, an example of means for effecting such mixing being hereinafter described.

Microwave energy 34 penetrates into the heated substance 16 for distances which are typically about 20 centimeters. If the conveyor 21 has a conductive surface 28, it is not necessarily that the layer of substance 16 have a thickness equal to the full penetration depth in order to accomplish full absorption of the microwave energy 34 before a substantial portion of the energy disperses towards the chamber 13 walls. If the layer of substance 16 has a height equal to one half the maximum penetration depth, then energy 34 which has not been absorbed during the initial downward passage is reflected upwardly and absorbed as it propagates back towards the surface of the layer. Heating is much more uniform under this condition as the heating effect of the reflected energy is strongest at the lower portion of the layer of substance 16 thereby compensating for the diminished heating of the lower portion during the initial downward travel of the energy.

Loading of substances 16 onto the conveyor belt 21 in layers of optimum thickness as described above is often not feasible because of the proportions of the heating installation 11 or because of properties of the substance itself. High efficiency of microwave utilization can still be realized if the volume of substance 16 on the conveyor belt 21 departs substantially from the optimum value. First, it should be observed that the initially directionalized energy 34 will be repeatedly reflected back and forth between belt surface 28 and the conductive top plate 29 before its direction of propagation becomes completely randomized. In many cases, an acceptably high degree of absorption in substance 16 will occur in the course of such reflections and before a sizable portion of the energy penetrates into the dielectric walls of the chamber 13. Energy losses by absorption in the walls of the chamber 13 can be still further reduced by microwave reflective panels 64 situated to block penetration of such energy into portions of the chamber sidewalls 41a, 41b and preferably the endwalls 42a and 42b as well.

Referring again to FIGS. 2 and 3 in conjunction, the present embodiment includes electrically conductive side panels 64a and 64d adjacent housing walls 41a and 41b respectively and extending downward from top plate 29 within chamber 13 towards the sides of conveyor belt 21. The side panels 64a, 64b which may be metal terminate a short distance, typically several centimeters, above the level of conveyor belt to avoid arcing between such elements. Arcing and resistance heating at the junctures of side panels 64a and 64b with top plate 29 may be avoided by joining such members with electrically conductive welds 66 or, alternately, by shortening the side panels to provide gaps between the top plate and the upper edges of the panels.

For similar purposes, electrically conductive end panels 67a and 67b may extend downward from top plate 29 towards conveyor belt 21 adjacent the dielectric end walls 42a and 42b respectively of the chamber 13. End panels 67a have lower edges spaced above the conveyor belt 21 a distance sufficient to allow for passage of substances 16 into and out of the chamber 13 and, to avoid arcing, are either connected to the ends of side panels 64a, 64b by welds 66a or spaced from the ends of the side panel a distance sufficient for the purpose.

During operation of the apparatus 11, the conductive panels 64, 67 increase efficiency by reflecting dispersing microwave energy which has not been absorbed in substance 16 during its initial passage or passages through the substance and which would otherwise be unproductively absorbed in the dielectric walls of chamber 13. In the present embodiment, as best seen in FIG. 2, such panels 64, 67 in conjunction with top panel 29 and conveyor belt 21 itself have the effect of largely, but not completely, surrounding the substance 16 with microwave reflective surfaces. Thus initially unabsorbed energy has a high probability of eventually reentering the substance 16 and contributing to the desired heating.

It should be recognized that the above discussed conductive or metal elements, panels 64, 67, top plate 29 and conveyor belt 21 do not jointly constitute a structurally integral metal chamber of the known type that not only relfects microwave energy internally but is also self-supporting and still further serves to prevent outward propagation of microwave energy into the surrounding environment. The present invention at least partially separates these functions. It is primarily the dielectric material 39 that provides for structural integrity and support and that also assures containment of the microwave energy except, in the present embodiment, at the top of chamber 13 where top plate 29 performs these functions and also serves to reflect the energy.

Several modifications may be used, where necessary, to avoid any undesirable underheating of the portions of substance 16 that are in contact with the conductive surface 28 of belt 21. As previously discussed, electrical field intensity is zero at the surface of a conductor in a microwave field and metal conveyors would also appear to be a form of heat sink which might thermally conduct heat away from the underside of substance 16. I have found that underheating of some substances 16 at the zone of contact with a metal surface in a microwave chamber is negligible. Other substances 16 exhibit very definite underheating in the absence of corrective measures. For example, ground meat patties can be very satisfactorily cooked with microwave energy while resting on a metal surface but significant undercooking of bacon strips is observed in a similar situation. It is postulated that the solution of salts and liquified fat which rapidly develops on the surface of cooking bacon may itself be sufficiently conductive to act somewhat as an extension of the underlying conductive metal surface. In any case, processing of some substances may not require any corrective measures for the effects of an underlying metal surface while such meassures may be highly advantageous while processing other substances.

Referring now to FIG. 5, an electrically conductive metal belt 21a is also usually an excellent thermal conductor and this property can be turned to an advantage by applying additional, non-microwave generated heat to the substance 16a through the belt. The microwave heating apparatus 11a of FIG. 5 may be generally similar to that previously described although as this particular example is designed to precook bacon slices 16a, the dielectric material 39a of chamber housing 12a is faced with ceramic tiles 65 of the type that are generally specified for food processing installations. At least most such ceramics are highly absorptive of microwave energy as are the mortars used to bind such tiles 65 into a structure.

To counteract possible underheating of the undersides of bacon slices 16a, a hot gas supply 68 directs heated air or steam, for example, against the underside of belt 21a prior to entrance of the belt into housing 12a. Other heat sources, such as electrical heaters, may also be employed to heat the belt 21a. Thus supplementary, economically produced heat is transferred to the bacon slices 16a by conduction through the belt 21a as the bacon slices progress through the microwave heating apparatus 11.

In some instances, of which the precooking of bacon slices 16a is an example, it is more cost effective to accomplish a partial preheating of substances prior to entry into the microwave heating region of housing 12a as described in my prior U.S. Pat. No. 3,906,115. This may be combined with preheating of the belt 21a by directing the heated air or steam or both towards the upper surface of the belt 21a after loading of the bacon slices 16a onto the belt. The belt preheating housing 69 in which hot gas is directed at belt 21a may be shifted a distance away from the microwave chamber housing 12a, as indicated by dashed lines 69' in FIG. 5, to enable loading of substances onto the belt after passage of the belt through preheating housing 69 in instances where preheating of the substances 16a is not desired.

Heating of the belt 21a may also, or alternatively, be accomplished internally within the microwave heating housing 12a and transfer of supplementary heat to the underside of substances 16a is not necessarily limited to thermal conduction through the belt. For example, with reference to FIG. 6, a porous belt 21a may be utilized and manifolds 71 may be positioned within the microwave containment chamber 13a to direct heated air from a hot gas supply 68a upwardly through the apertures 72 of the belt. Such a porous belt 21a will reflect microwave energy in the manner hereinbefore described provided that the dimensions of the apertures 72 are small in relation to the microwave wavelength. Heated air or the like may also be directed downwardly towards belt 21a within the microwave heating region, an example of apparatus for the purpose being hereinafter described.

Other structural modifications may also be used, alternately or in conjunction with belt heating as described above, to promote heating of substances in the region immediately adjacent the belt. Referring to FIG. 7, the upper surface 28b of the belt 21c may be formed with raised protuberances 73 which are transverse ribs in this example but which may also take other forms such as longitudinal ribs or spaced upwardly extending dimples, for example. Such protuberances 73 function to hold some or all of the bulk of the heated substances in spaced apart relationship from the primary conductive surface 28b of the belt 21c at which electrical field intensity is zero.

Referring to FIG. 8, a similar result may be accomplished by disposing a layer of electrically non-conductive material 74 against the conductive surface 28c of the belt 21d to hold substances in spaced apart relationship from such surface. Microwave energy readily penetrates such material 74, which may be any of various insulative plastics for example, and thus there is no significant interference with reflection of such energy by the belt in the manner previously described. The non-conductive material 74 need not be relied upon to impart structural strength to the belt 21d as a whole.

Referring now to FIG. 9, operations at a conveyorized microwave heating apparatus 11b can be more efficient in some cases if the microwave containment region is divided into two or more subchambers, such as subchambers 13c and 13d in this example, so that different power levels of microwave energy can be directed into substances 16b at different portions of the path of travel of the conveyor belt 21e from separately controlled microwave input means 37i and 37j. The microwave absorbencies of some substances 16b, of which fatty meats are again an example, is dependent on temperature. Thus it may be advantageous to vary the microwave power input at successive stages of the path of travel to compensate for the increased temperature of such substances as heating progresses. The power input to fatty meats, for example, may be reduced in stages as the substance 16b becomes hotter and therefor a more efficient absorber of microwave. In order to do this, the subchambers 13c, 13d must be electrically isolated from each other so that the microwave field in one does not interact significantly with the microwave field in the other. Otherwise, microwave energy propagates from one subchamber 13c to the other 13d and reduces or eliminates the desired power level differential and an undesirable electrical coupling of the microwave generators 37i and 37j can take place. Such coupling interferes with operation of the generators 37i, 37j and can be damaging under some circumstances.

Subchangers 13c and 13d cannot be electrically isolated from each other if they are communicated through an unobstructed passage formed wholly of metal elements and which has either a height or width greater than the microwave wavelength in order to accommodate a sizable conveyor. Such a passage is in effect a waveguide that transmits the microwave energy.

Electrical isolation of the subchambers 13c and 13d is easily and simply provided for in apparatus 11b of the present kind while also providing a sizable passage 76 between the subchambers for a large conveyor belt 21e or the like. In this example, the division between subchambers 13c and 13d is defined in part by spaced apart subchamber end panels 78 and 79 formed of microwave reflective metal that extend downward from top plate 29b to the top of passage 76 at opposite ends of the passage. The top of passage 76 in this embodiment is deifned by an additional metal panel 80 which extends between the lower edges of end panels 78 and 79 in parallel relationship to the metal conveyor belt 21e, the contacting edges of panels 78, 79 and 80 being secured together by welding or the like to provide a continuous conductive surface at the junctures.

Except in instances where the dielectric floor 43a of the subchambers 13c, 13d is sufficiently close to the underside of conveyor belt 21e to define a gap trap below the belt, an additional volume 77 of lossy dielectric material extends upward from the floor for such purpose. Thus microwave energy attempting to propagate between subchambers 13c and 13d below the metal belt 21e is attenuated in the manner hereinbefore described.

The substance 16b on conveyor belt 21e absorbs and attenuates microwave energy which propagates into passage 76 above the belt. Thus such energy is productively used to heat the substances 16b in the course of preventing microwave transmission between the subchambers 13c, 13d.

The passage 76 need not necessarily be as long as the passages of gap traps that are used to prevent release of microwave energy into the outside environment as a low level of energy exchange between subchambers 13c, 13d may be acceptable at least in some cases.

The passage 76 between subchambers 13c and 13d is an advantageous location for means 83 for mixing or stirring substances 16b during passage through the microwave heating apparatus 11b in instances where mixing is desirable. In this example, such means 83 are spaced apart tubular metal tines 84 which extend downward from panel 80 into the substances 16b on the conveyor 21e although other types of mixing or stirring device may also be used.

The chamber 85 formed by end panels 78, 79 and panel 80 may, if desired, be utilized to direct a flow of heated air or the like to substances 16b on the conveyor 21e to supplement the microwave heating which tends to be somewhat reduced at the surface regions of some substances. Moisture forced to the surface by microwave heating of of such substances 16b evaporates and exerts a cooling effect in the process. This may be counteracted by connecting a source 68b of heated air or the like to chamber 85 through top plate 29b. In this embodiment, the heated air flows into the substances 16b through the tubular tines 84. Alternately or in addition, the heated air may be released into subchambers 13c, 13d through apertures 82 in end panels 78 and 79, the apertures being sufficiently small to block entry of microwave energy into chamber 85.

The above described structure of FIG. 9 for electrically isolating subchambers 13c and 13d from each other relies in part on the microwave absorbency of the heated substance 16b itself. A variation of the isolating means 86, depicted in FIG. 10, may advantageously be employed in instances where the absorbency of the heated substance may be insufficient for the purpose. The microwave heating apparatus 11c including the isolating means 86 may be similar to that previously described except that the top of the passage 76a between the subchambers 13e and 13f is defined by a volume 87 of lossy dielectric material rather than by an electrically conductive element as in the previously described embodiment. The volume 87 of lossy dielectric material is sufficient thick to absorb the microwave energy which disperses upwardly from passage 76a either directly or as a result of reflection by the conductive upper surface of the conveyor 21f. Thus the volume 87 of lossy dielectric material in conjunction with the conductive conveyor belt 21f constitutes another gap trap which attenuates microwave energy, as it propagates along passage 76a, in the manner hereinafter described.

While the invention has been described with respect to certain specific embodiments, many variations are possible and it is not intended to limit the invention except as defined in the following claims.

I claim:

1. In apparatus for heating substances with microwave energy having a microwave energy containment housing that includes a heating chamber and which further includes access passages communicating with said heating chamber through which substances may enter and leave said heating chamber, conveyor means for carrying said substances along a predetermined path in said heating chamber and microwave input means for directing microwave energy into said heating chamber, the improvement comprising:

at least portions of said microwave containment housing in the region of said heating chamber being formed of microwave absorbent electrically lossy dielectric material of sufficient thickness to absorb substantially all microwave energy that propagates outwardly from said heating chamber within said dielectric material, said dielectric material of said housing being positioned to intercept and absorb microwave energy that propagates away from said heating chamber without entering said access passages.

2. The apparatus of claim 1 wherein portions of said housing that are formed of said microwave absorbent dielectric material include housing wall portions extending along opposite sides of said conveyor means, further including an electrically conductive plate spaced from said conveyor means and facing the region between said housing wall portions, said input means being positioned to direct said microwave energy towards said conveyor means from the region of said electrically conductive plate.

3. The apparatus of claim 2 wherein said electrically conductive plate forms a microwave reflective portion of said housing, said plate having edges which overlap said microwave absorbent dielectric housing wall portions for distances at least equal to one half of the wavelength of said microwave energy.

4. The apparatus of claim 2 wherein said conveyor means travels in the region of said heating chamber between said microwave input means and a portion of said housing which is formed of said dielectric material, further including electrically conductive means for reflecting microwave energy which has passed through substances carried by said conveyor means back towards said electrically conductive plate.

5. The apparatus of claim 2 further including electrically conductive wall panels within said heating chamber which extend along said dielectric wall portions of said housing and which face the region between said microwave input means and said conveyor means.

6. The apparatus of claim 5 wherein said wall panels have first edges joined to said plate and in electrical contact therewith and have opposite edges spaced from said conveyor means and electrically isolated therefrom.

7. The apparatus of claim 1 wherein a portion of said housing that is formed of said dielectric material has an opening providing for access to said chamber when said microwave input means is shut down, further including a microwave energy reflecting electrically conductive door disposed against said portion of said housing, said door being proportioned to overlap said dielectric wall portion around the boundary of said opening for a distance sufficient to suppress escape of microwave energy through said opening, and releasable means for securing said door at said opening during operation of said microwave input means.

8. The apparatus of claim 1 wherein said access passages includes a portion of said housing having a conveyor access tunnel forming a passage through which said conveyor means extends into said heating chamber from a location exterior to said heating chamber, wherein at least portions of the wall of said tunnel are formed of electrically lossy dielectric material of sufficient thickness to absorb substantially all microwave energy that penetrates into said dielectric material during a single passage of said penetrating microwave energy within said dielectric material, and wherein said conveyor means has an electrically conductive surface facing a dielectric portion of said wall of said tunnel and being spaced apart therefrom.

9. The apparatus of claim 1 wherein said electrically lossy dielectric material has a thickness of at least about 20 centimeters.

10. The apparatus of claim 1 wherein said conveyor means in the region of said heating chamber is situated between said microwave input means and a portion of said housing that is formed of said dielectric material and wherein said conveyor means includes electrically conductive material positioned to intercept microwave energy which passes through the substances carried by said conveyor means prior to entry of said microwave energy into said dielectric material and to reflect said microwave energy back towards said input means.

11. The apparatus of claim 10 wherein said conveyor means has a microwave energy reflecting surface of electrically conductive material facing said substances that are carried by said conveyor means.

12. The apparatus of claim 11 further including means for maintaining said substances in a substantially spaced apart relationship from said microwave energy reflecting surface as said conveyor means carries said substances along said predetermined path.

13. The apparatus of claim 1 wherein said conveyor means includes a continuous metallic belt extending along said predetermined path in position to support said substances at said predetermined path, said belt being located between said input means and a portion of said housing that is formed of said dielectric material and being positioned to reflect microwave energy away from said dielectric material, and drive means for traveling said metallic belt and substances carried theron along said path.

14. The apparatus of claim 1 wherein said conveyor means includes an electrically and thermally conductive flexible metal belt for supporting said substances, means for travelling said belt along said predetermined path, and means for transferring supplementary heat to said substances through said metal belt.

15. The apparatus of claim 14 wherein said means for transferring supplementary heat to said substances through said metal belt includes a heat source positioned to heat said metal belt.

16. The apparatus of claim 14 wherein said belt has spaced apart perforations therethrough and wherein said means for transferring supplementary heat to said substances through said metal belt includes a source of hot gas positioned to direct said hot gas at said substances through said perforations.

17. The apparatus of claim 1 further including isolating means for suppressing microwave propagation between first and second heating regions of said heating chamber while providing a conveyor passage between said first and second heating regions through which said conveyor means extends wherein said isolating means includes a volume of said microwave absorbent electrically lossy dielectric material forming a wall of said passage and being positioned to intercept and absorb microwave energy which propagates into said conveyor passage.

18. The apparatus of claim 17 wherein microwave energy reflective material is disposed along a wall of said passage in position to reflect microwave energy, which propagates away from said substances carried by said conveyor means, back towards said conveyor means through said substances.

19. The apparatus of claim 17 further including means for mixing said substances carried by said conveyor means during travel of said substances through said conveyor passage.

20. The apparatus of claim 19 further including means for directing hot gas into said substances through said mixing means within said conveyor passage.

21. Apparatus for heating substances with microwave energy comprising a continuous belt conveyor positioned to carry said substances through a heating region, said continuous belt conveyor having microwave energy reflective material situated below said substances, means for defining access passages through which said substances may enter and leave said heating region, means for driving said continuous belt conveyor, a microwave containment housing at said heating region having sidewalls of microwave absorbent dielectric material extending along each side of said continuous belt conveyor at the sides of said heating region, said sidewalls being positioned to intercept and absorb microwave energy that propagates away from said heating region without entering said access passages, means for directing microwave energy towards said microwave energy reflective material of said continuous belt conveyor through said substances carried thereon, and microwave energy reflective means for intercepting and returning microwave energy that propagates away from said substances on said continuous belt conveyor within said heating region.

22. A conveyorized microwave heating chamber comprising:
spaced apart housing sidewalls of microwave absorbent electrically non-conductive material,
a housing top wall spanning said sidewalls to define a microwave containment region in conjunction therewith, said top wall having electrically conductive material facing said containment region and which overlaps said sidewalls for a distance sufficient to suppress escape of microwave energy at the junctions between said top wall and said sidewalls,
conveyor access tunnels situated at opposite ends of said microwave containment region and each having sidewalls walls and a top wall formed of microwave absorbent electrically non-conductive material,
a conveyor extending into said microwave containment region through one of said access tunnels and extending out of said microwave containment region through the other of said access tunnels, said conveyor being formed at least in part of electrically conductive material and having an upper surface facing said non-conductive top walls of said access tunnels and facing said conductive top wall of said housing in spaced apart relationship to each thereof,
means for driving said conveyor to carry substances which are to be heated through said microwave containment region, and
waveguide means for directing microwave energy downwardly from said housing top wall towards said upper surface of said conveyor.

* * * * *